US011227401B1

(12) United States Patent
Mahieu et al.

(10) Patent No.: US 11,227,401 B1
(45) Date of Patent: Jan. 18, 2022

(54) MULTIRESOLUTION VOXEL SPACE

(71) Applicant: Zoox, Inc., Foster City, CA (US)

(72) Inventors: Robert Evan Mahieu, San Francisco, CA (US); David Pfeiffer, Foster City, CA (US); James William Vaisey Philbin, Palo Alto, CA (US); Zeng Wang, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/420,090

(22) Filed: May 22, 2019

(51) Int. Cl.
| | | |
|---|---|---|
| *G06T 7/521* | (2017.01) | |
| *G06T 15/08* | (2011.01) | |
| *G06T 15/06* | (2011.01) | |
| *G06T 17/20* | (2006.01) | |
| *G06T 7/11* | (2017.01) | |
| *G05D 1/02* | (2020.01) | |
| *G06K 9/72* | (2006.01) | |

(52) U.S. Cl.
CPC .......... *G06T 7/521* (2017.01); *G05D 1/0231* (2013.01); *G05D 1/0257* (2013.01); *G06K 9/726* (2013.01); *G06T 7/11* (2017.01); *G06T 15/06* (2013.01); *G06T 15/08* (2013.01); *G06T 17/20* (2013.01); *G06T 2207/10028* (2013.01); *G06T 2207/10044* (2013.01); *G06T 2207/30252* (2013.01)

(58) Field of Classification Search
CPC . G06T 7/521; G06T 7/11; G06T 15/06; G06T 15/08; G06T 17/20; G06T 2207/10028; G06T 2207/10044; G06T 2207/30252; G05D 1/0231; G05D 1/0257; G06K 9/726
See application file for complete search history.

(56) References Cited

U.S. PATENT DOCUMENTS

| | | | | |
|---|---|---|---|---|
| 9,633,483 | B1* | 4/2017 | Xu | .......................... G06T 17/10 |
| 2011/0202538 | A1* | 8/2011 | Salemann | ............... G06F 16/29 |
| | | | | 707/741 |
| 2014/0368807 | A1* | 12/2014 | Rogan | ................... G01S 7/4808 |
| | | | | 356/28 |
| 2018/0012370 | A1* | 1/2018 | Aghamohammadi | .... G06T 7/50 |
| 2018/0075643 | A1* | 3/2018 | Sequeira | ............... G01S 7/4808 |

(Continued)

OTHER PUBLICATIONS

Hornung, Armin, "OctoMap: an efficient probabilistic 3D mapping framework based on octrees", "Autonomous Robots", 2013, SpringerLink, vol. 34, pp. 189-206 (Year: 2013).*

(Continued)

*Primary Examiner* — Terrell M Robinson
(74) *Attorney, Agent, or Firm* — Lee & Hayes, P.C.

(57) ABSTRACT

A multiresolution voxel space is discussed herein. Data can be represented in individual levels in the multiresolution voxel space. A first level can correspond to a first region of an environment and a second level can correspond to a second region of an environment, the second region corresponding to a subset of the first region. In some examples, the levels can comprise a same number of voxels, such that the first level covers a large, low resolution region, while the second level covers a smaller, higher resolution region, though more levels are contemplated. Data represented in the voxel spaces can be processed at higher resolution where available and at a lower resolution where a data density is lower and combined in an intelligent manner. Voxel spaces can be updated based on movement of the sensor providing the data.

20 Claims, 9 Drawing Sheets

(56) References Cited

U.S. PATENT DOCUMENTS

| | | | | |
|---|---|---|---|---|
| 2018/0364717 A1* | 12/2018 | Douillard | ............ | G06K 9/00791 |
| 2019/0258737 A1* | 8/2019 | Wang | .................. | G06K 9/00791 |
| 2020/0107048 A1* | 4/2020 | Yea | ...................... | H04N 19/154 |

OTHER PUBLICATIONS

Asvadi, Alireza, "3D Lidar-based static and moving obstacle detection in driving environments: An approach based on voxels and multi-region ground planes", "Robotics and Autonomous Systems", vol. 83, pp. 299-311. (Year: 2016).*

"Octree", Jan. 2012, Wikipedia, Wayback Machine Archives, pp. 1-2 (Year: 2012).*

Droeschel, David, "Local Multi-Resolution Surfel Grids for MAV Motion Estimation and 3D Mapping", Jan. 2014, "Conference: 13th International Conference on Intelligent Autonomous Systems (IAS)", ResearchGate, pp. 1-13. (Year: 2014).*

\* cited by examiner

MULTIRESOLUTION VOXEL SPACE

BACKGROUND

Sensor data can be captured to represent objects in an environment. In some cases, sensor data can be associated with a voxel space for subsequent processing. In some cases, increasing a size of a voxel space and/or number (density) of voxels rapidly increases an amount of memory and/or processing on such data, which can present challenges in resource-constrained environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
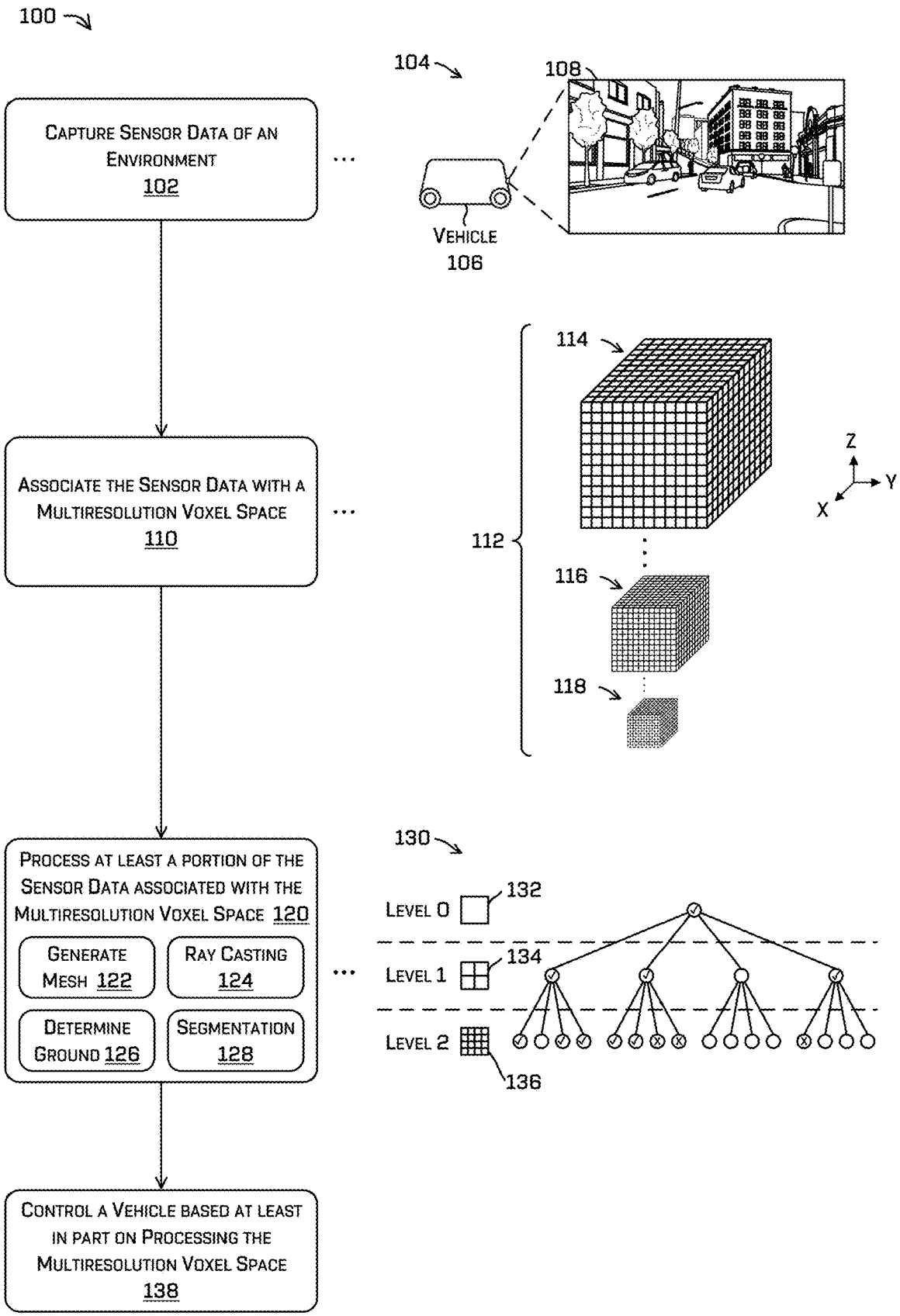
FIG. 1 is a pictorial flow diagram of an example process for associating sensor data with a multiresolution voxel space, and subsequent processing.

This disclosure is directed to a multiresolution voxel space. In some examples, a multiresolution voxel space can include a plurality of levels or data structures, whereby data can be represented in one or more of the plurality of levels. For example, a first level of a voxel space can correspond to a first region of an environment, whereby a voxel of the first level can represent a first volume in the environment. A second level of the voxel space can correspond to a second region of an environment, whereby a voxel of the second level can represent a second volume in the environment. In some examples, the first level and the second level can at least partially overlap or otherwise correspond to a same portion of space in an environment. In some examples, the first level and the second level can comprise a same number of voxels, such that the first level covers a large, low resolution area, while the second level covers a smaller, higher resolution area. As data is captured representing an environment, the data can be associated with a voxel of the first level and/or a voxel of the second level of the voxel space. Data represented in the voxel space can be processed at higher resolution where available (e.g., near an origin associated with a sensor) and at a lower resolution where a data density is lower (e.g., further away from the origin associated with a sensor).

In some examples, a variety of sensor data can be associated with the voxel space. For example, in some instances, the voxel space can represent lidar data, radar data, time-of-flight data, or any other depth data.

In some examples, the techniques discussed herein can be implemented in the context of a vehicle, such as an autonomous vehicle. The autonomous vehicle can capture sensor data as the vehicle traverses an environment and can associate the sensor data with the multiresolution voxel space. A computing device associated with the autonomous vehicle can process data represented in the voxel space to perform various operations such as a mesh generation operation, a ray casting operation, a ground plane determination operation, a segmentation operation, and the like.

A multiresolution voxel space may comprise any number of levels. By way of example, and without limitation, a first level can represent a volume of 100 meters (m)×100 m×50 m (length×width×height), where an individual voxel of the first level is 1 m×1 m×0.5 m. By way of example, and without limitation, a second level can represent a volume of 50 m×50 m×25 m, where an individual voxel of the second level is 0.5 m×0.5 m×0.25 m. By way of example, and without limitation, a third level can represent a volume of 25 m×25 m×12.5 m, where an individual voxel of the first level is 0.25 m×0.25 m×0.125 m. Of course, the multiresolution voxel space can include any number of levels associated with any number or sizes of voxels.

In some examples, a number of voxels in each level may be the same as other levels, though, in other examples, the number of voxels may differ.

In some examples, the multiresolution voxel space can be thought of as nested voxel spaces (e.g., similar to Russian nesting dolls), whereby voxels of decreasing size are located within an outermost root level voxel space. In at least some examples, the dimensions of one level may be related to the next, higher resolution, level. As non-limiting examples of such, a subsequent level may have two, four, or any even integer number of voxels along any dimension, though any other number (whether natural, rational, or irrational) is contemplated.

In some examples, portions of the multiresolution voxel space may be represented as a hierarchy of voxels. For example, a point in the voxel space may be located with a voxel of a first level, a voxel of a second level, and a voxel of a third level. In some examples, a hierarchy of voxels is based at least in part on a location with respect to the voxel space.

As noted above, techniques may include performing operations based on data associated with the voxel space. In the context of a meshing operation, techniques can include generating a mesh (e.g., one or more planes representing an environment) based on data stored in or associated with the voxels. However, in some instances, a portion of an environment can be represented by data associated with various levels of the voxel space. In such a case, techniques herein are directed to intelligently selecting a level of the voxel space to generate a mesh to represent an environment. For example, techniques may include determining whether enough data is accumulated in a voxel of a level of the voxel space. If enough data is available (e.g., if a number of data points associated with a voxel is above a threshold) a mesh may be generated using the voxel data. However, if enough data is not available (e.g., if the number of data points associated with the voxel is below the threshold), the techniques may include generating a mesh using data associated with a level above the level that is lacking data.

By way of example, in an example where a "parent" voxel is associated with a plurality of "children" voxels (in the hierarchical multiresolution voxel space), if all of the children voxels include sufficient data (or are not occupied) the children data are used to generate a mesh. However, if one or more children voxels have insufficient data, the parent voxel can be used to generate a mesh.

In any of the examples, the highest resolution voxels may store any number of data regarding previous sensor measurements including, but not limited to, number of measurements, average positions, covariances of the measurements, and the like. In various examples, where any such data is available at a higher resolution level, such data may be used to populate higher resolution levels (e.g., by averaging or otherwise combining). Otherwise, the parent may be used.

As noted above, sensor data may be captured by a sensor as the sensor (or device) moves about an environment and the sensor data can be represented in the multiresolution voxel space. Based on the movement, the voxels may be intelligently updated, such as, for example, by averaging data from high resolution voxels to provide data for lower resolution voxels which are no longer within a particular range.

Techniques may further include performing ray casting operations based on the voxel space. For example, ray casting operations can be used to determine whether a voxel represents or is associated with a dynamic object or a static object. For example, a voxel that is occupied at a first time but that is not occupied at a second time may be associated with a dynamic object. In a multiresolution voxel space comprising a first level and a second level, ray casting operations can include performing a first ray casting operation based on the first level of the voxel space and performing a second ray casting operation based on the second level of the voxel space. In some examples, results from the first and second ray casting operation can be compared to determine if a voxel is associated with a dynamic object or a static object. For example, if the first ray casting operation determines that a first voxel (e.g., a parent voxel) is associated with a static object but the second ray casting operation determines that a second voxel (e.g., a child voxel) is associated with a dynamic object (where the first voxel and the second voxel correspond to a same space in an environment), the techniques can include determining that the space corresponds to a dynamic object.

Techniques may further include performing a ground surface determination operation. For example, a ground surface determination operation can include receiving semantic information based on data associated with a target voxel, whereby the semantic information indicates whether the target voxel is associated with a ground surface. Further, the ground surface determination operation can include evaluating voxels that are neighboring voxels to the target voxel to determine whether the neighboring voxels represent a horizontal surface. For example, for a voxel in a three-dimensional voxel space, a target voxel can comprise neighboring voxels in a +/−x-direction, in a +/−y-direction, and/or in a +/−z-direction. In some examples, a target voxel can comprise 26 neighboring voxels. In some examples, a neighboring voxel can be considered to be a horizontal voxel if a gradient or slope based on connecting a centroid associated with a target voxel and a centroid of the neighboring voxel does not meet or exceed a threshold value. In some examples, a neighboring voxel can be considered to be a horizontal voxel if a plane associated with a neighboring voxel (based on the data associated with the neighboring voxel) is horizontal (e.g., a normal vector associated with the plane is within a threshold value of a reference vector). In some cases, if the number of neighboring voxels that are horizontal is above a threshold (and if the semantic information indicates the target voxel is a ground voxel) the target voxel can be considered to be a candidate ground voxel.

Techniques may further include performing segmentation operations. For example, segmentation information can be received or otherwise determined, thereby identifying an object in an environment. In some examples, first segmentation information can be associated with a first portion of voxels of a first level of a voxel space. In some examples, second segmentation information can be associated with a second portion of voxels of a second level of the voxel space. In the context of a multiresolution voxel space where a ground surface has been removed, operations can include clustering voxels of the first level and the second level to determine (e.g., via region growing or other clustering techniques) that the voxel space represents an object. In some examples, segmentation techniques can be performed via a top-down representation of the voxel space, whereby a representation of the voxel space can be input to a machine learned model that is trained to output a mask associated with an object. In general, segmentation operations and/or clustering can be performed across levels of the multiresolution voxel space.

In some instances, sensor data may be represented in a voxel space as raw sensor data (e.g., with individual <x, y, z, range, time, etc.> values associated with data points) or may be represented as a statistical accumulation of data. For example, sensor data may be accumulated in the voxel space, with an individual voxel including processed data, such a number of data points, an average intensity, an average x-value of sensor data associated with the individual voxel, an average-y value of the sensor data associated with the individual voxel, an average z-value of the sensor data associated with the individual voxel, and/or a covariance matrix based on the sensor data associated with the voxel.

In some examples, as an autonomous vehicle moves throughout an environment, areas of the environment may be covered by various levels of the multiresolution voxel grid at different times. In some cases, as an autonomous vehicle travels forward, a leading edge (with respect to a direction of travel) of a level of the voxel space may not comprise information. However, as a portion of the level may be associated with one or more parent voxels, the techniques can include using data at a level where it is available (e.g., at a lower resolution level) until data at another level (e.g., a higher resolution level) is available.

The techniques discussed herein can improve a functioning of a computing device, such as a computing device of an autonomous vehicle, in a number of ways. For example, using multiple levels in the multiresolution voxel space facilitates high resolution management of data near a vehicle and lower resolution management of data further away from a vehicle. Such levels significantly reduce an amount of memory for storing sensor data, for example, when compared to a voxel space associated with a single, high resolution level. In some instances, complex multi-dimensional data, such as lidar data or other depth data, can be represented in a voxel space, which can partition the data, allowing for efficient evaluation and processing of the data. In some instances, the techniques provide robust processes to quickly segment a ground plane for trajectory generation, for example. Information associated with the ground plane can be omitted or set aside, and object identification can be performed on a reduced dataset, reducing an amount of memory and processing required for operations. Static and dynamic objects can be identified using robust clustering techniques, which further simplifies processing by focusing tracking operations on dynamic objects, for example. These and other improvements to the functioning of computing devices are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver controlled vehicles in which such a system may provide an indication of whether it is safe to perform various maneuvers. In another example, the techniques can be utilized in a manufacturing assembly line context, or in an aerial surveying context. Additionally, the techniques described herein can be used with real data (e.g., captured using sensor(s)), simulated data (e.g., generated by a simulator), or any combination of the two.

FIG. 1 is a pictorial flow diagram of an example process 100 for associating sensor data with a multiresolution voxel space, and subsequent processing.

At operation 102, the process can include capturing sensor data of an environment. An example 104 illustrates a vehicle 106 capturing sensor data 108 of an environment. In some examples, the sensor data 108 can comprise lidar data, radar data, sonar data, time-of-flight data, or other depth data. For example, the operation 102 can include capturing image data and generating depth data based on the captured image data.

At operation 110, the process can include associating the sensor data with a multiresolution voxel space. A multiresolution voxel space is illustrated as an example voxel space 112. By way of example, and without limitation, the example voxel space 112 may comprise a first level 114, a second level 116, and a third level 118.

The first level 114 is illustrated as a voxel space comprising twelve voxels in each dimension (e.g., x, y, z), although any number of voxels may be included in the voxel space. In some instances, the first level 114 may correspond to a physical environment, such as an area around an origin or a virtual origin of the sensor data.

The second level 116 is illustrated as a voxel space comprising twelve voxels in each dimension (e.g., x, y, z), although any number of voxels may be included in the voxel space. In some instances, the second level 116 may correspond to a physical environment, such as an area around an origin or a virtual origin of the sensor data.

The third level 118 is illustrated as a voxel space comprising twelve voxels in each dimension (e.g., x, y, z), although any number of voxels may be included in the voxel space. In some instances, the third level 118 may correspond to a physical environment, such as an area around an origin or a virtual origin of the sensor data.

In some examples, if a side length represented by the first level 114 is x, a side length represented by the second level 116 can be x/2, and a side length represented by the third level 118 can be x/4. That is, the example voxel space 112 can include levels starting with a root-level resolution (e.g., a lowest resolution), and every new (finer resolution) level starts at half extents of the previous level. In some examples, each new level can represent third, fourth, or fifth extents, although any levels of resolution can be used for the various levels, as discussed herein.

Although three levels 114, 116, and 118 are discussed in FIG. 1, it can be understood that the example voxel space 112 can include any number of voxels and/or levels, and the examples shown are but one possible implementation.

In some examples, an origin of each of the first level 114, the second level 116, and the third level 118 can be associated with a same location (e.g., a center of the vehicle 106, an origin or a virtual origin associated with a sensor capturing the sensor data 108, and the like).

In some examples, as data is captured over time, the operation 110 may include aligning a meta spin (e.g., a sensor dataset associated with data from a plurality of sensors) with the voxel space. For example, the operation 110 can include determining a transformation to apply to the meta spin to align the meta spin to the voxel space. In particular, the operation 110 may include matching captured sensor data with data accumulated in the voxel space by determining the distance of observed points to a plane fitted to the existing accumulation of data, using iterative closest point techniques, and the like. In some examples, this transformation may reduce an error between a position of a vehicle with respect to a location on a global map.

In one example, the voxel space may be initialized as empty space and sensor data may be added to the voxel space as it is captured, and another example, the voxel space may be initialized with data representing a global map of previously captured data. In the case of using global map data, the operations may include comparing the locally captured sensor data against the global data to localize the autonomous vehicle in the global map space.

In some instances, the operation 110 can include mapping individual points of the sensor data (e.g., which may include a point cloud) to individual voxels.

In some examples, voxels within the voxel space can be instantiated when data is to be associated with such a voxel, thereby reducing or minimizing an amount of memory associated with a voxel space. In at least some examples, this can be performed using (as a non-limiting example), techniques such as voxel hashing. In some examples, some or all voxels of a voxel space can be preinitialized, and the operation 110 can include discarding or omitting voxels that do not include data, or that include a number of points below a threshold number, in order to create a sparse voxel space. Further, in some instances, the operation 110 can include aligning a pose of the vehicle 106 (e.g., an orientation of the vehicle 106) and associated sensor data with the voxel space, for example, to compensate or adjust for any error associated with a position of the vehicle with respect to the voxel space.

Further, in some instances, the operation 110 can include statistically accumulating sensor data and processing the data as it is added to individual voxels. For example, individual voxels may include data representing a number of data points, an average intensity, an average x-value of the data, an average y-value of the data, an average z-value of the data, and/or a covariance matrix based on the sensor data associated with the individual voxel. Thus, in some instances, data associated with individual voxels may represent processed data, in part, to improve processing performance of the system.

At operation 120, the process can include processing at least a portion of the sensor data associated with the multiresolution voxel space. For example, aspects of the operation 120 can include a generate mesh operation 122, a ray casting operation 124, a determine ground operation 126, and/or a segmentation operation 128.

In general, the generate mesh operation 122 can include determining, for a plurality of levels of the example voxel space 112, which voxel(s) to use when generating a mesh based on the sensor data.

An example 130 illustrates a hierarchal representation of a voxel of the example voxel space 112. For example, a voxel 132 can represent a voxel in the first level 114 of the example voxel space 112. A group of voxels 134 can represent voxels of the second level 116 that correspond to a same volume of an environment as the voxel 132. And a group of voxels 136 can represent voxels of the third level 118 that correspond to a same volume of an environment as the voxel 132 and the group of voxels 134.

The example 130 represents states of the respective voxels. Each voxel of the voxels 132, 134 and 136 is represented as a circle. A state of a respective voxel is represented by a " " (blank), an "x", or a "✓". A blank circle indicates that no data is associated with the voxel (e.g., the voxel is free space), although, as noted above, in some cases voxels are instantiated when data is to be associated with a voxel. That is, in some examples, the example 130 represents a voxel space conceptually and does not necessarily represent a data structure associated with the voxel space. An "x" indicates that data is associated with the voxel but that an amount of data does not exceed a threshold value sufficient to create a mesh. A "✓" indicates that data is associated with the voxel and that an amount of data meets or exceeds a threshold value sufficient to create a mesh.

In some examples, the generate mesh operation 122 can include determining a plane based at least in part on data associated with a voxel and/or clipping the plane based at least in part on a size of the respective voxel.

Additional details for selecting a level and/or voxel for generating a mesh are discussed in connection with FIGS. 4A and 4B, as well as throughout this disclosure.

In general, the ray casting operation 124 can include the use of ray-surface interaction tests to determine an occupancy of voxels over time. For example, a ray casting operation can analyze a ray associated with a sensor data point to determine that voxels through which the ray passes are clear of obstructions. In some examples, by monitoring a voxel space over time, the ray casting operation 124 can determine that a voxel associated with an object at a first time is not associated with an object at a second time after the first time (e.g., that the object has moved).

In some examples, the ray casting operation 124 can be performed for each level of the example voxel space 112. An output associated with each level can be compared to correlate potential static or dynamic objects in one level with static or dynamic objects in another level.

Additional details of the ray casting operation 124 are discussed in connection with FIG. 5, as well as throughout this disclosure.

In general, the determine ground operation 126 can include functionality to determine a ground surface represented in the example voxel space 112. For example, the determine ground operation 126 can receive semantic information indicative of whether the voxel space represents ground. Further, the determine ground operation 126 can determine, based on a state of neighboring voxels (e.g., whether a number of horizontal neighboring voxels meets or exceeds a threshold), whether a voxel is a candidate ground voxel.

Additional details of the determine ground operation 126 are discussed in connection with FIG. 6, as well as throughout this disclosure.

In general, the segmentation operation 128 can include segmenting voxels in the example voxel space 112 to determine one or more objects represented in the example voxel space 112. In some cases, when a ground plane is removed (e.g., in the determine ground operation 126), clustering techniques can be used to cluster voxels based on an adjacency of occupied voxels. In some examples, the segmentation operation 128 can be based at least in part on segmentation information (e.g., identifying a classification and/or a particular object) received from another component. In some examples, the segmentation operation 128 can segment and/or cluster voxels across the levels 114, 116, and/or 118.

Additional details of the segmentation operation 128 are discussed in connection with FIG. 7, as well as throughout this disclosure.

At operation 138, the process can include controlling a vehicle based at least in part on processing the multiresolution voxel space. In some examples, the operation 138 can be performed by the vehicle 106. In some examples, the operation 138 can include generating a route, trajectory, and/or control signals for one or more systems of the vehicle 106 to navigate the vehicle 106 within the environment.

Figure 2:
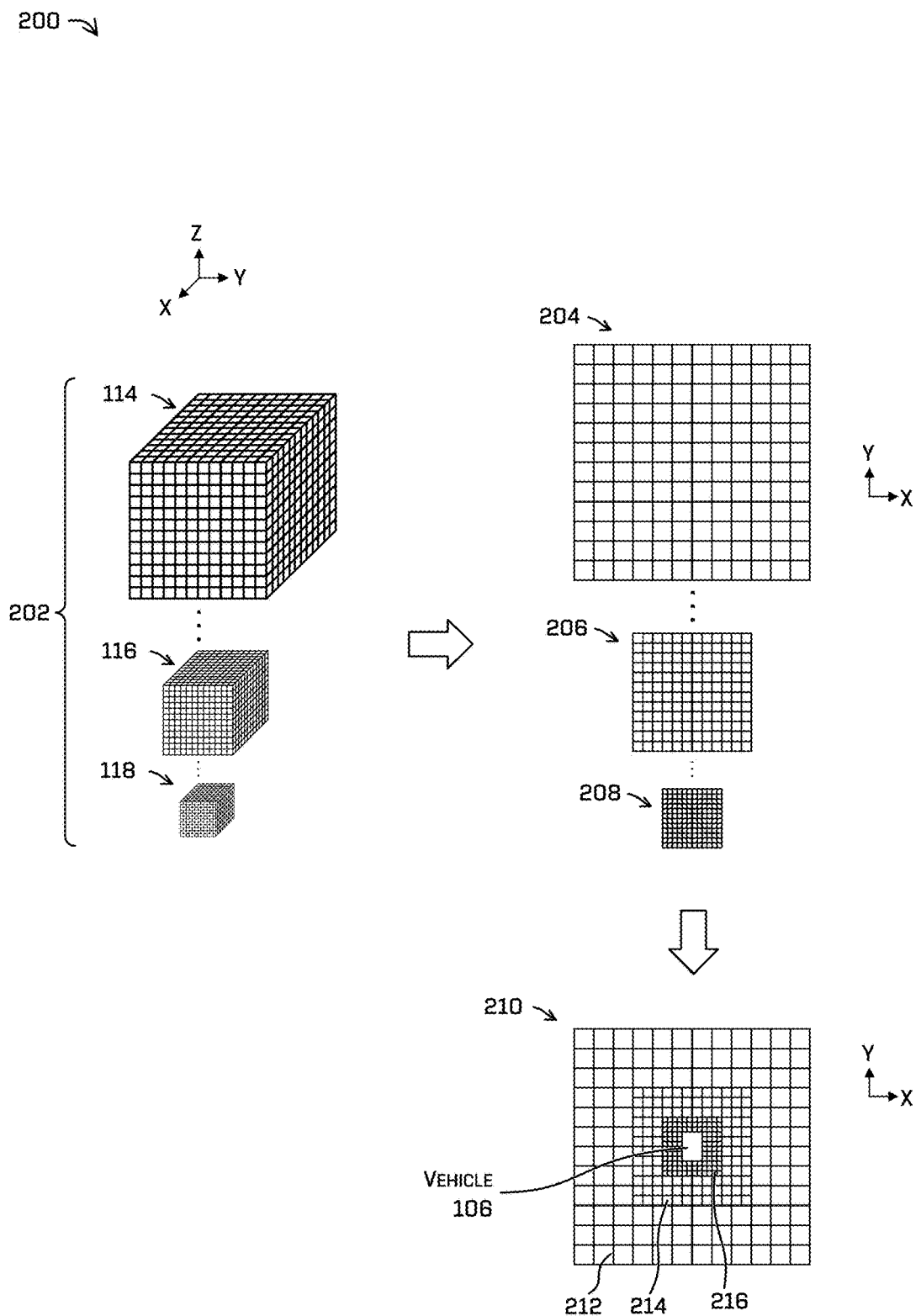
FIG. 2 depicts an example of a multiresolution voxel space.

FIG. 2 depicts an example 200 of a multiresolution voxel space 202. In some cases, the multiresolution voxel space 200 can correspond to the example voxel space 112 of FIG. 1.

The multiresolution voxel space 202 is illustrated in three dimensions (e.g., x, y, z) and includes the first level 114, the second level 116, and the third level 118.

A two-dimensional representation (e.g., illustrating the x-y aspect of the first level 114) is illustrated as a first level 204.

A two-dimensional representation (e.g., illustrating the x-y aspect of the second level 116) is illustrated as a second level 206.

A two-dimensional representation (e.g., illustrating the x-y aspect of the third level 118) is illustrated as a third level 208.

An example 210 depicts the levels 204, 206, and 208 (or the levels 114, 116, and 118) collocated with respect to the vehicle 106. That is, the voxel levels 204, 206, and 208 can correspond to a portion of an environment proximate the vehicle 106.

As can be seen by the example 210, some portions of a multiresolution voxel space can be associated with one level, two levels, three levels, or any number of levels. For example, a point 212 can be associated with the first level 204. A point 214 can be associated with the first level 204 and the second level 206. That is, the point 214 can be represented in a first voxel associated with the first level 204 and a second voxel associated with the second level 206, where the first voxel and the second voxel at least partially overlap. A point 216 can be associated with the first level 204, the second level 206, and the third level 208. That is, the point 216 can be represented in a first voxel associated with the first level 204, a second voxel associated with the second level 206, and a third voxel associated with the third level 208, where the first voxel, the second voxel, and the third voxel at least partially overlap.

In some examples, operations can include accumulating data in each voxel independently of other voxels and/or voxel levels. That is, sensor data may be represented in a voxel space as raw sensor data (e.g., with individual <x, y, z, range, time, etc.> values associated with data points) or may be represented as a statistical accumulation of data. For example, sensor data may be accumulated in the voxel space, with an individual voxel including processed data, such a number of data points, an average intensity, an average x-value of sensor data associated with the individual voxel, an average-y value of the sensor data associated with the individual voxel, an average z-value of the sensor data associated with the individual voxel, and/or a covariance matrix based on the sensor data associated with the voxel. Sensor data can be accumulated independently for each voxel, even in the case where a voxel of one level at least partially overlaps a voxel of another level.

Figure 3:
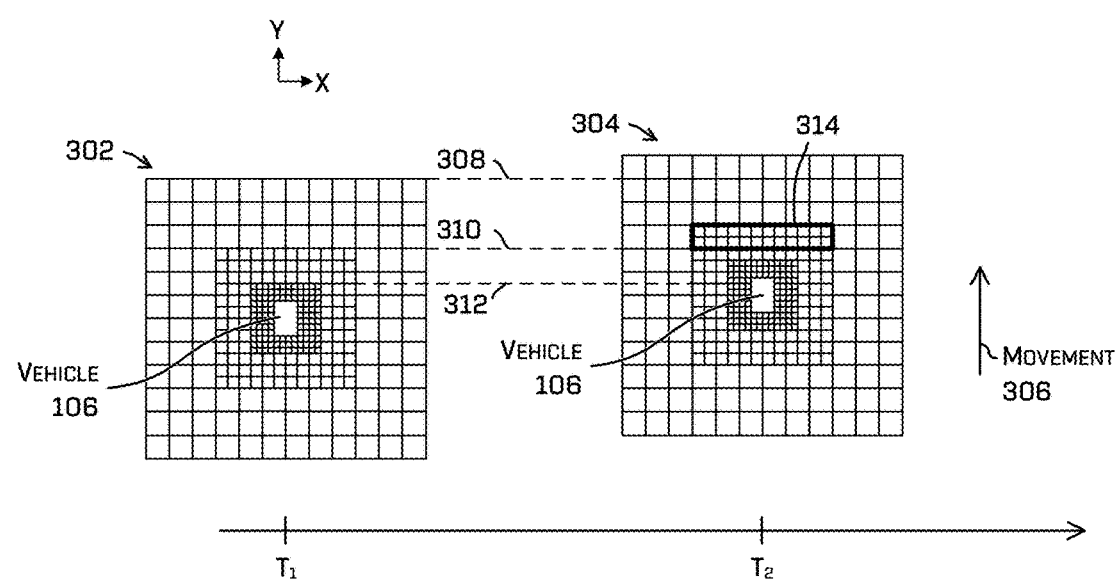
FIG. 3 depicts an example of movement within the multiresolution voxel space.

FIG. 3 depicts an example 300 of movement within the multiresolution voxel space. For example, FIG. 3 illustrates a multiresolution voxel space 302 at a first time $T_1$ and a multiresolution voxel space 304 at a second time $T_2$ after the first time. As illustrated, the multiresolution voxel space 304 is shifted with respect to the multiresolution voxel space 302 due to movement 306 of the vehicle 106 associated with the multiresolution voxel spaces 302 and 304.

Reference lines 308, 310, and 312 illustrate the relative position of the leading edges of the various levels of the multiresolution voxel space 302 and 304. For example, the reference line 308 represents a relative position of a first level of the multiresolution voxel space 302 relative to the multiresolution voxel space 304. The reference line 310 represents a relative position of a second level of the multiresolution voxel space 302 relative to the multiresolution voxel space 304. And the reference line 312 represents a relative position of a third level of the multiresolution voxel space 302 relative to the multiresolution voxel space 304.

In some examples, the multiresolution voxel spaces 302 and/or 304 can correspond to the multiresolution voxel spaces 112 and/or 202.

In some examples, as the vehicle 106 traverses an environment (represented as the movement 306), the multiresolution voxel space 302 can be updated to a new position associated with the multiresolution voxel space 304. As illustrated, in some examples, the multiresolution voxel space 302 can be updated when a distance of the movement 306 corresponds to a size of a largest voxel (e.g., an extent of a voxel of the first level), as represented by the reference line 308. That is, the multiresolution voxel space 302 can be shifted by a distance of a largest voxel of the multiresolution voxel space 302.

By way of example, and without limitation, as the multiresolution voxel space 302 is updated to the multiresolution voxel space 304 between the first time and the second time, a portion 314 of a second level of the multiresolution voxel space 304 corresponds to a new area of the environment not covered by the second level multiresolution voxel space 302. In such an example, the portion 314 (e.g., of the second level) may not be associated with data at the second time $T_2$. Because the portion 314 corresponding to the second level of the multiresolution voxel space 304 may not contain data at the second time, a region of the environment corresponding to the portion 314 can be represented by data associated with a first level of the multiresolution voxel space 304 rather than by data associated with a second level of the multiresolution voxel space 304.

With respect to the trailing edge(s) of the multiresolution voxel space 302 (based on a direction of the movement 306), some operations can include determining data associated with a lower resolution voxel based on data associated with a higher resolution voxel. For example, when a portion of an environment that is represented by a higher resolution level at a first time and is represented by a lower resolution level at a second time after the first time, operations can include averaging, aggregating, or otherwise determining data associated with the lower resolution voxels based on data associated with the higher resolution voxels. In some cases, this can save memory by reducing or obviating memory stored in overlapping portions of the levels of the voxel space by storing data at a highest resolution level and calculating or determining data associated with a lower resolution level on demand. Additional details of intelligently selecting a level of the multiresolution voxel space for processing are discussed below in connection with FIGS. 4A and 4B.

Figure 4A:
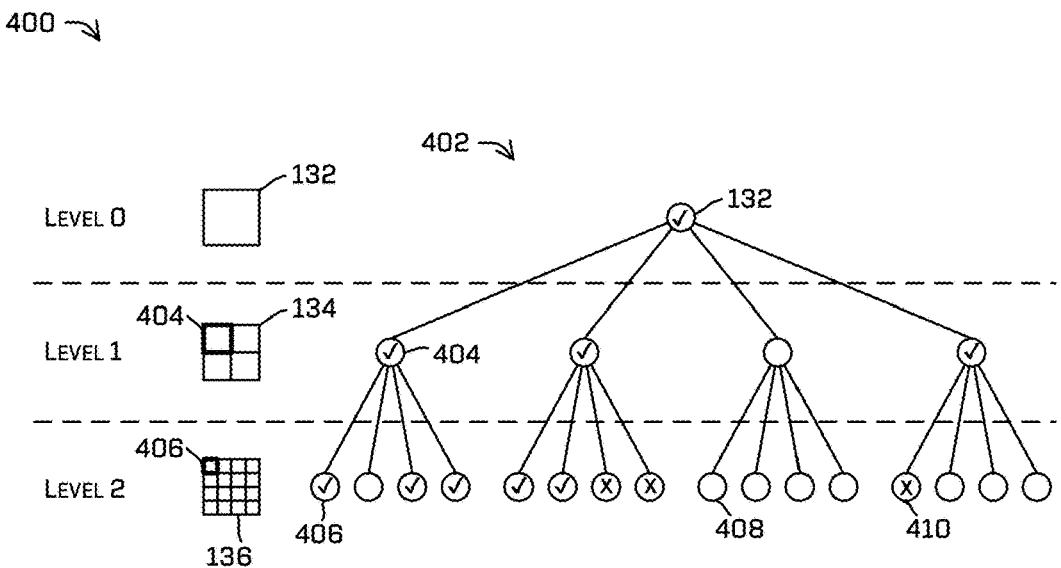
FIG. 4A depicts an example hierarchal structure associated with the multiresolution voxel space.

FIG. 4A depicts an example 400 hierarchal structure associated with the multiresolution voxel space. In some instances, the example 400 represents a portion of a multiresolution voxel space 112, 202, 302, and/or 304.

As noted above, the voxel 132 can represent a voxel in a first level of an example voxel space. In some examples, a first level in a voxel space can also be designated as "level 0." The group of voxels 134 can represent voxels of a second level that correspond to a same volume of an environment as the voxel 132. In some examples, a second level in a voxel space can also be designated as "level 1." And a group of voxels 136 can represent voxels of a second level that correspond to a same volume of an environment as the voxel 132 and the group of voxels 134. In some examples, the multiresolution voxel space can represent any number of levels and is not limited to three levels as illustrated herein.

The hierarchical voxel space can be represented as a tree structure 402. In some examples, the voxel 132 can correspond to a root node or parent voxel. A voxel 404 is represented as a child voxel with respect to the voxel 132. In some examples, the voxel 404 can represent ⅛ (one-eighth) of the volume of the voxel 132.

Further, a voxel 406 is represented as a child voxel with respect to the voxel 404 (and the voxel 132). In some examples, the voxel 406 can represent Vi of the volume of the voxel 404. Further, the voxel 406 can represent 1/32 (one thirty-second) of the volume of the voxel 132. In some examples, the some or all of the environment represented by the voxel 406 can correspond to some of the environment represented by the voxel 404. Similarly, some or all of the environment represented by the voxel 404 can correspond to some of the environment represented by the voxel 132. Due to this hierarchical relationship between voxels, sensor data that is associated with the voxel 406 can necessarily be associated with the voxel 404 and the voxel 132.

The tree structure 402 represents states of the respective voxels. Each voxel of the voxels 132, 134 and 136 is represented as a circle. A state of a respective voxel is represented by a " " (blank), an "x", or a "✓". A blank circle (e.g., represented by a voxel 408) indicates that no data is associated with the voxel (e.g., the voxel is free space). In some examples, voxels associated with an amount of data less than a threshold amount can also be represented as an empty voxel.

An "x" (e.g., represented by a voxel 410) indicates that data is associated with the voxel but that an amount of data does not exceed a threshold value sufficient to create a mesh or to otherwise perform an operation, such as localization, segmentation, ground determination, ray casting, and the like. In some examples, the threshold value can correspond to ten data points (e.g., ten lidar data points), although the threshold value can be sent at any level. In some examples, the threshold value can be set to ensure that a mesh generated from the data points has enough data to withstand noisy data. In some examples, the threshold value can be based at least in part on an uncertainty associated with sensor data, an uncertainty associated with a sensor, and the like.

A "✓" (e.g., represented by a voxel 406) indicates that data is associated with the voxel and that an amount of data meets or exceeds a threshold amount sufficient to create a mesh. In some implementations, the threshold amount may correspond to ten data points, although the threshold value may vary.

In some examples, a multiresolution voxel space can be a sparse voxel space, such that voxels can be instantiated when data is to be associated with such a voxel (e.g., when using voxel hashing, or similar techniques). In some cases, some or all of a voxel space can be instantiated (regardless of whether data is to be stored with a voxel) whereby empty voxels can be "removed" or "deleted" from the voxel space if no data is stored therein. Such a representation of a sparse voxel space is provided below in connection with FIG. 4B.

Figure 4B:
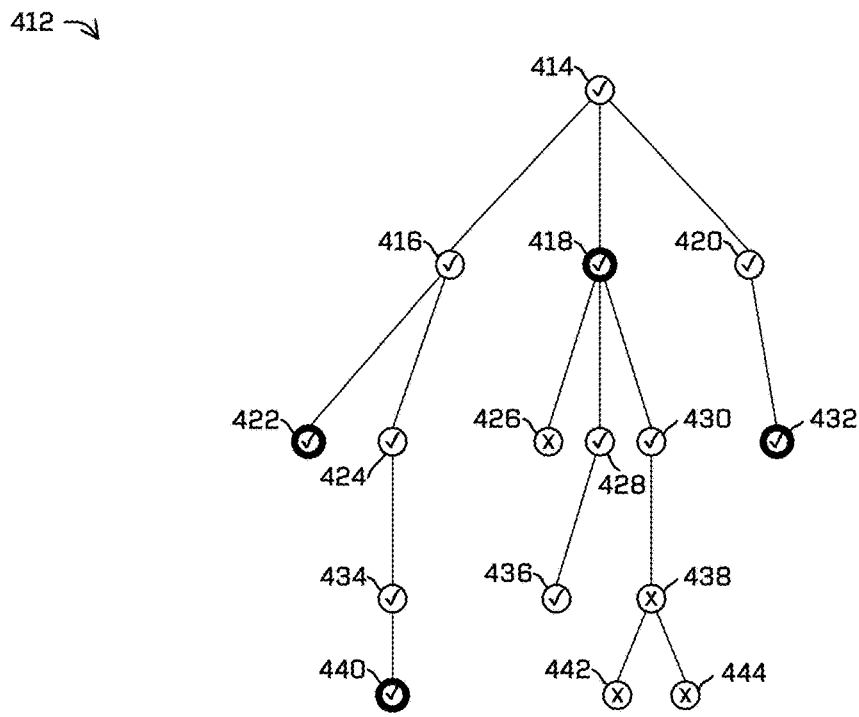
FIG. 4B depicts an example of selecting voxels of the hierarchal structure for subsequent processing.

FIG. 4B depicts an example 412 of selecting voxels of the hierarchal structure for subsequent processing. The example 412 represents a portion of a multiresolution voxel space. As illustrated the example 412 represents five levels or levels. In some examples, empty voxels have been removed such that the example 412 illustrates a sparse voxel space (and/or for ease of discussion).

A root voxel is illustrated as a voxel 414. In some examples, the voxel 414 can correspond to a first level (or level 0).

A second level of voxels includes voxels 416, 418, and 420. In some examples, the second level can correspond to a level 1.

A third level of voxels includes voxels 422, 424, 426, 428, 430, and 432. In some examples, the third level can correspond to a level 2.

A fourth level of voxels includes voxels 434, 436, and 438. In some examples, the fourth level can correspond to a level 3.

A fifth level of voxels includes voxels 440, 442, and 444. In some examples, the fifth level can correspond to a level 4.

Voxels that are represented by a bolded outline correspond to voxels that have been selected for meshing. As illustrated, voxels 422, 440, 418, and 432 have been selected for meshing. That is, operations can include generating a mesh based on the sensor data associated with the respective voxels 422, 440, 418, and 432 for localizing a vehicle, updating a global map, determining a ground portion, segmenting objects, and the like.

A voxel is selected based on a hierarchy in the tree structure and on an amount of data associated with each voxel. For example, a voxel is selected for meshing closest to the root level (e.g., the voxel 414) that has a non-meshable child (e.g., represented as an "x") for meshing. For example, with respect to the voxel 418, this voxel is closest to the root voxel (e.g., the voxel 414) and includes a non-meshable child (e.g., the voxel 426). The voxel 422 is selected as a voxel to mesh as the voxel 422 represents highest level of detail and does not include any non-meshable children voxels. The voxels 440 and 432 are selected for a similar reason.

By way of another example, if the voxel 426 represented empty space (and was removed from the tree structure, accordingly), the voxels 436 and 430 would be meshable voxels.

By way of another example, if the voxel 416 represented an insufficient amount of information to create a mesh (e.g., if the voxel 416 represented an "x" state), the data represented by the voxel 414 would be used for any subsequent meshing operation.

In this manner, the techniques minimize a loss of information while also ensuring detail where available.

Figure 5:
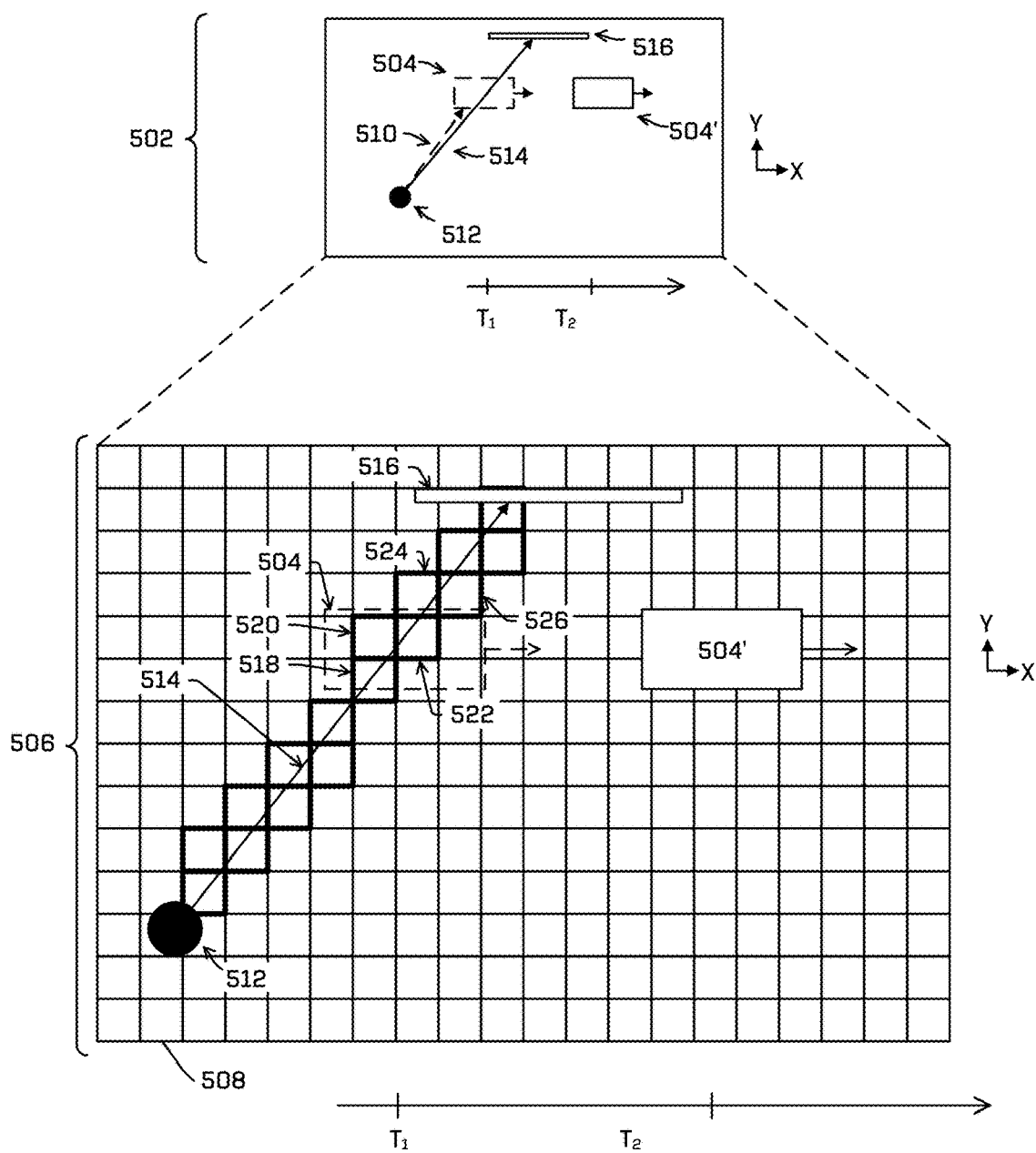
FIG. 5 illustrates an example illustration associated with ray casting and dynamic object segmentation.

FIG. 5 illustrates an example illustration 500 associated with ray casting and dynamic object segmentation.

An example 502 illustrates a top view representation of an environment in which an object 504 traverses from a first location at a first time $T_1$ to a second location at a second time $T_2$ that is after $T_1$. In some examples, the object 504 at time $T_2$ can be represented as an object 504'.

An example 506 illustrates a voxel space 508, which may correspond to a level of a multiresolution voxel space (e.g., 112, 202, 302, and/or 304). In some instances, the voxel space 508 includes sensor data representing objects in an environment.

In the examples 502 and 506, a vector 510 may represent sensor data captured by a sensor 512 in an environment to identify and segment the object 504. Subsequently, at a second time, $T_2$, the sensor 512 may capture sensor data represented as a vector 514 to identify and segment an object 516, which may correspond to a wall or building, for example.

In the examples 502 and 506, the vector 514 is illustrated as originating from an origin associated with the sensor 512 (e.g., associated with a sensor capturing the sensor data represented in the voxel space 508) and passing through various voxels to capture data associated with the object 516. As may be understood, the vector 514 is associated with the second time $T_2$, whereby the object 504 has moved from the first position at time $T_1$ to the second position at time $T_2$ associated with the object 504'. Accordingly, the vector 514 passes through voxels 518, 520, 522, 524, and 526 which were previously occupied by data representing the object 504 at time $T_1$. Further, the techniques described herein may include determining some or all of the voxels through which the vector 514 passes through to determine that previously occupied voxels 518, 520, 522, 524, and 526 are not occupied at the second time $T_2$. Thus, the ray casting illustrated in the example 506 provides an additional technique to determine that the object 504 and 504' is a dynamic object.

Further, the ray casting technique illustrated herein can be used to clear the voxels 518, 520, 522, 524, and 526 at the second time, $T_2$. Thus, the techniques described herein can update a state of the voxel space over time to reduce an amount of data to be maintained at an instant in time, as well as to improve operations to generate a mesh and/or to detect and segment dynamic objects in a voxel space.

In another example, the ray casting techniques can be used to compare locally captured sensor data against previously captured global map data. For example, the object 504 may correspond to an object represented in the global map data. However, if the vector 514 passes through the voxels representing the object 504, when the vector 514 represents locally captured sensor data, the techniques can determine that there is a difference between the global map and the local map. In some instances, the difference may indicate that the global map is incorrect or that a state of the environment has changed (e.g., the physical world has changed, by removing a tree, for example). In this manner, as differences between the global map and the local sensor data are determined, the differences can be uploaded to a central server to be incorporated into the global map data (if the difference is verified by consensus (e.g., by repeated observations of the same or similar event or data) or if a confidence level of the data is above a threshold amount), and distributed to other vehicles.

In some examples, ray casting can be performed for each level of a multiresolution voxel space. In some examples, an output of a ray casting operation can indicate whether a particular voxel is occupied or is free, and whether the voxel is occupied by or is associated with a static object or a dynamic object. In the context of the hierarchal voxel space, an occupancy and/or static/dynamic representation of parent and child voxels may differ. In some examples, the output of ray casting operations for the various levels can be aggregated to correlate information for subsequent processing.

Figure 6:
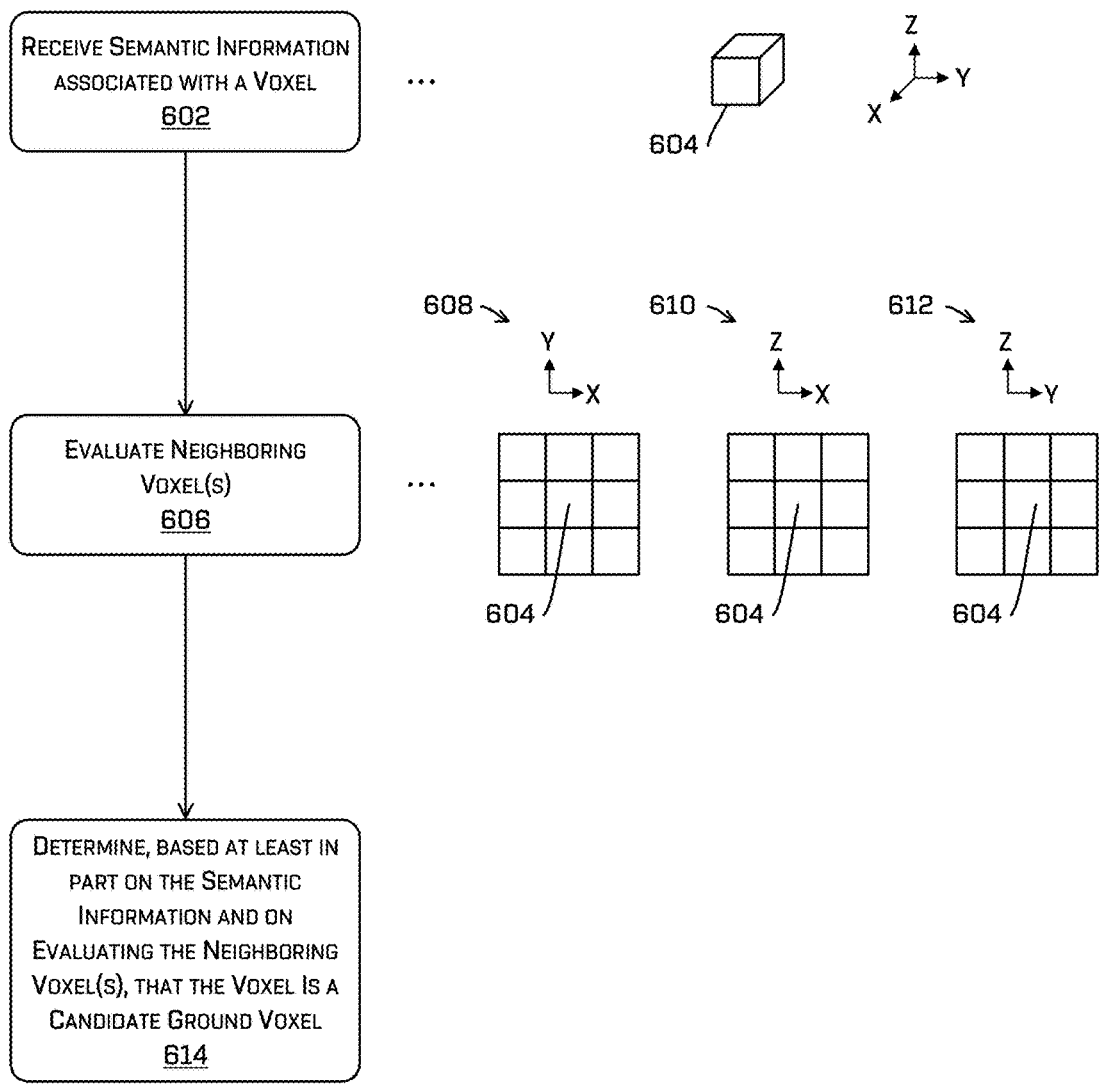
FIG. 6 is a pictorial flow diagram of an example process for determining a ground surface in a voxel space.

FIG. 6 is a pictorial flow diagram of an example process 600 for determining a ground surface in a voxel space. In some examples, the process 600 can represent a portion of operations associated with the determine ground operation 126 of FIG. 1.

At operation 602, the process can include receiving semantic information associated with a voxel. For example, sensor data captured by a sensor can be input to a machine learned model trained to determine semantic information about sensor data. An example of such a machine learned model and techniques for determining semantic information are discussed in, for example, in U.S. patent application Ser. No. 15/820,245 titled "Sensor Data Segmentation" and filed Nov. 21, 2017, which is incorporated by reference herein in its entirety.

In some examples, segmentation information may identify a classification of an object, including but not limited to, vehicle, pedestrian, bicyclist, animal, building, road, construction, plants, and the like. In some examples, segmentation information may comprise instance segmentation information which can be associated with individual voxels and/or data instances associated with each voxel.

A voxel 604 represents a target voxel subject to the operations discussed herein. That is, the process 600 can be performed for individual voxels to determine whether a target voxel is a candidate ground voxel.

At operation 606, the process can include evaluating neighboring voxel(s). In some examples, "neighboring voxel(s)" can correspond to voxels that are proximate to or are otherwise associated with the target voxel 604. Examples 608, 610, and 612 illustrate neighboring voxel(s) associated with the target voxel 604.

The example 608 illustrates neighboring voxels in an x-y plane associated with the target voxel 604. The example 610 illustrates neighboring voxels in an x-z plane associated with the target voxel 604. The example 612 illustrates neighboring voxels in a z-y plane associated with the target voxel 604.

In some cases, for a voxel in a three-dimensional voxel space, a target voxel can comprise neighboring voxels in a +/−x-direction, in a +/−y-direction, and/or in a +/−z-direction. In some examples, the target voxel 604 can comprise 26 neighboring voxels. In some cases, neighboring voxels can be considered from other levels. For example, for a voxel associated with a second level of a multiresolution voxel space, neighboring voxels may include 26 neighboring voxels associated with the second level and/or can include additional neighboring voxels in a first level of the voxel space (e.g., a parent level) and/or additional neighboring voxels in a third level of the voxel space (e.g., a child level).

In some examples, the operation 606 can include determining whether a neighboring voxel is a horizontal voxel. In some cases, such a determination can include determining whether a plane associated with a neighboring voxel is horizontal. In some examples, the operation 606 can include determining a centroid associated with a target voxel and a centroid associated a neighboring voxel. A gradient or slope can be determined with respect to the centroids, and the neighboring voxel can be considered to be a horizontal voxel if the gradient or slope does not meet or exceed a threshold value (e.g., with respect to a plane, such as an x-y plane, associated with the sensor). In some examples, a neighboring voxel can be considered to be a horizontal voxel if a normal vector associated with a plane associated with a neighboring voxel (based on the data associated with the neighboring voxel) is within a threshold value of a reference vector. In some cases, the operation 606 can include determining whether a number of neighboring voxels associated with the target voxel 604 is above a threshold value.

At operation 614, the process can include determining, based at least in part on the semantic information and on evaluating the neighboring voxel(s), that the voxel is a candidate ground voxel.

In some examples, if the semantic information indicates that the target voxel 604 is not a ground voxel and/or a number of neighboring voxels that are horizontal does not meet or exceed a threshold value, the operation 614 can include determining that the target voxel 604 is not a candidate ground voxel.

Additional techniques for determining whether a voxel is a ground voxel are discussed in, for example, in U.S. patent application Ser. No. 15/622,905 titled "Voxel based Ground Plane Estimation and Object Segmentation" and filed Jun. 14, 2017, which is incorporated by reference herein in its entirety.

Figure 7:
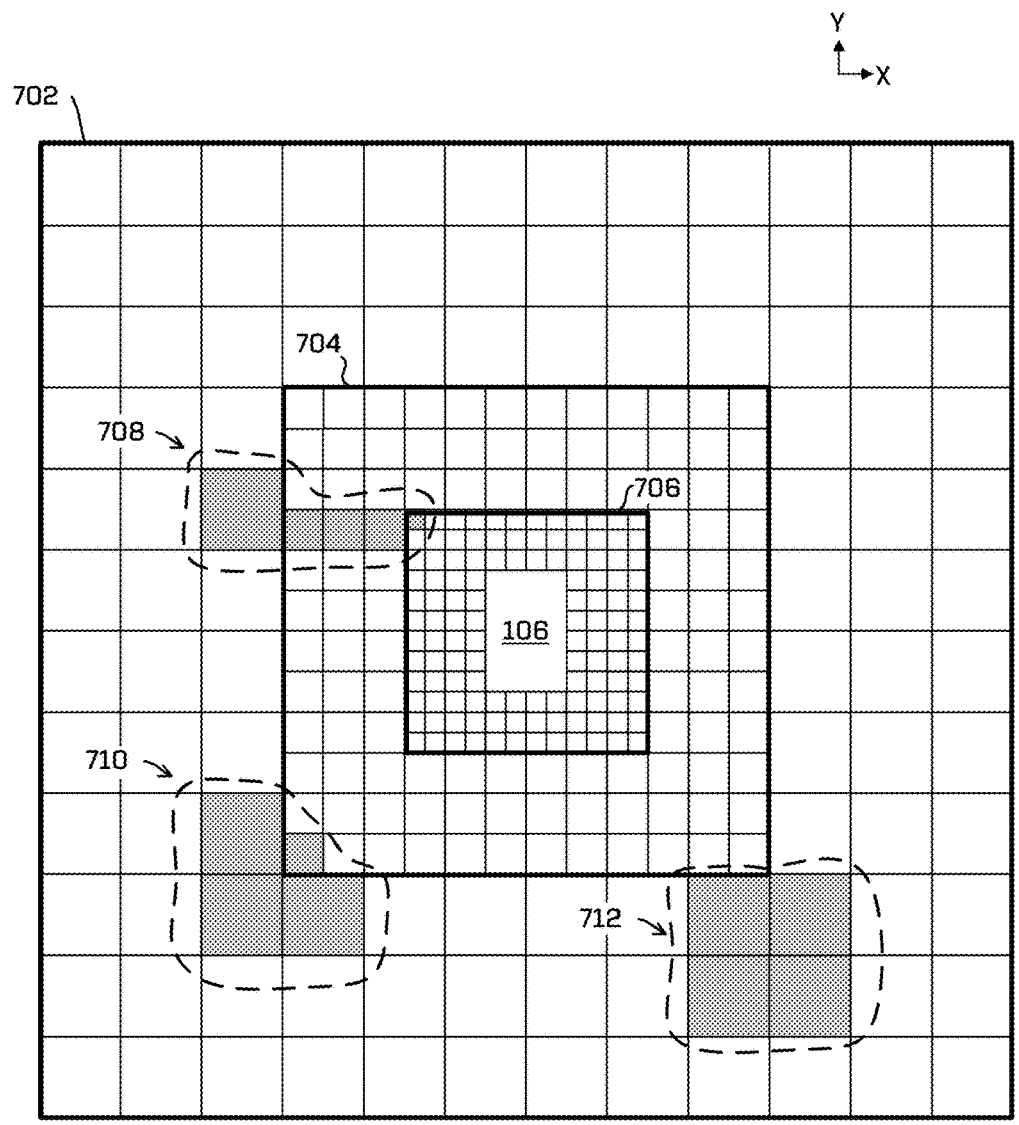
FIG. 7 depicts an example of segmentation in a multiresolution voxel space.

FIG. 7 depicts an example of segmentation in a multiresolution voxel space 700. In some examples, the multiresolution voxel space 700 can correspond to the multiresolution voxel spaces 112, 202, 302, and/or 304.

An outer boundary of a first level of the multiresolution voxel space 700 is illustrated as a boundary 702. An outer boundary of a second level of the multiresolution voxel space 700 is illustrated as a boundary 704. An outer boundary of a third level of the multiresolution voxel space 700 is illustrated as a boundary 706.

In some examples, voxels of the multiresolution voxel space 700 can be associated with sensor data, which can be represented as a voxel shaded in gray.

In some examples, segmentation techniques can be used to cluster or otherwise segment voxels to determine objects represented in the multiresolution voxel space 700. For example, region growing techniques or k-means clustering can be used to determine objects represented in the multiresolution voxel space 700. In some examples, a top-down representation of the voxel space can be used to determine mask(s) associated with object(s) for determining segmentation information. Examples of such top-down segmentation techniques are discussed in, for example, in U.S. patent application Ser. No. 15/963,833 titled "Data Segmentation Using Masks" and filed Apr. 26, 2018, which is incorporated by reference herein in its entirety.

In some examples, clustering techniques can be used to determine objects 708, 710, and 712. Of course, the objects 708, 710, and 712 are for illustrative purposes and are not intended to be limiting.

As illustrated in the multiresolution voxel space 700, the object 708 comprises voxels associated with the first level, the second level, and the third level. That is, the object 708 spans the boundaries 704 and 706. Thus, the object 708 illustrates that voxels of various levels or levels can be grouped together (e.g., using a neighbors technique or next nearest neighbors technique) to form a single object. For examples, neighboring voxels share a side or touch corners, as illustrated in FIG. 7.

Similarly, the object 710 can comprise voxels associated with the first level and the second level. By way of further example, the object 712 can comprise voxels associated with a single level or level. In some examples, segmentation operations can additionally be performed in a z-direction, which is not illustrated in FIG. 7 for simplicity.

In some examples, segmentation operations can consider neighboring voxels for segmenting objects. As noted above, in some examples, a voxel may be associated with 26 neighboring voxels (e.g., in three-dimensional space).

Figure 8:
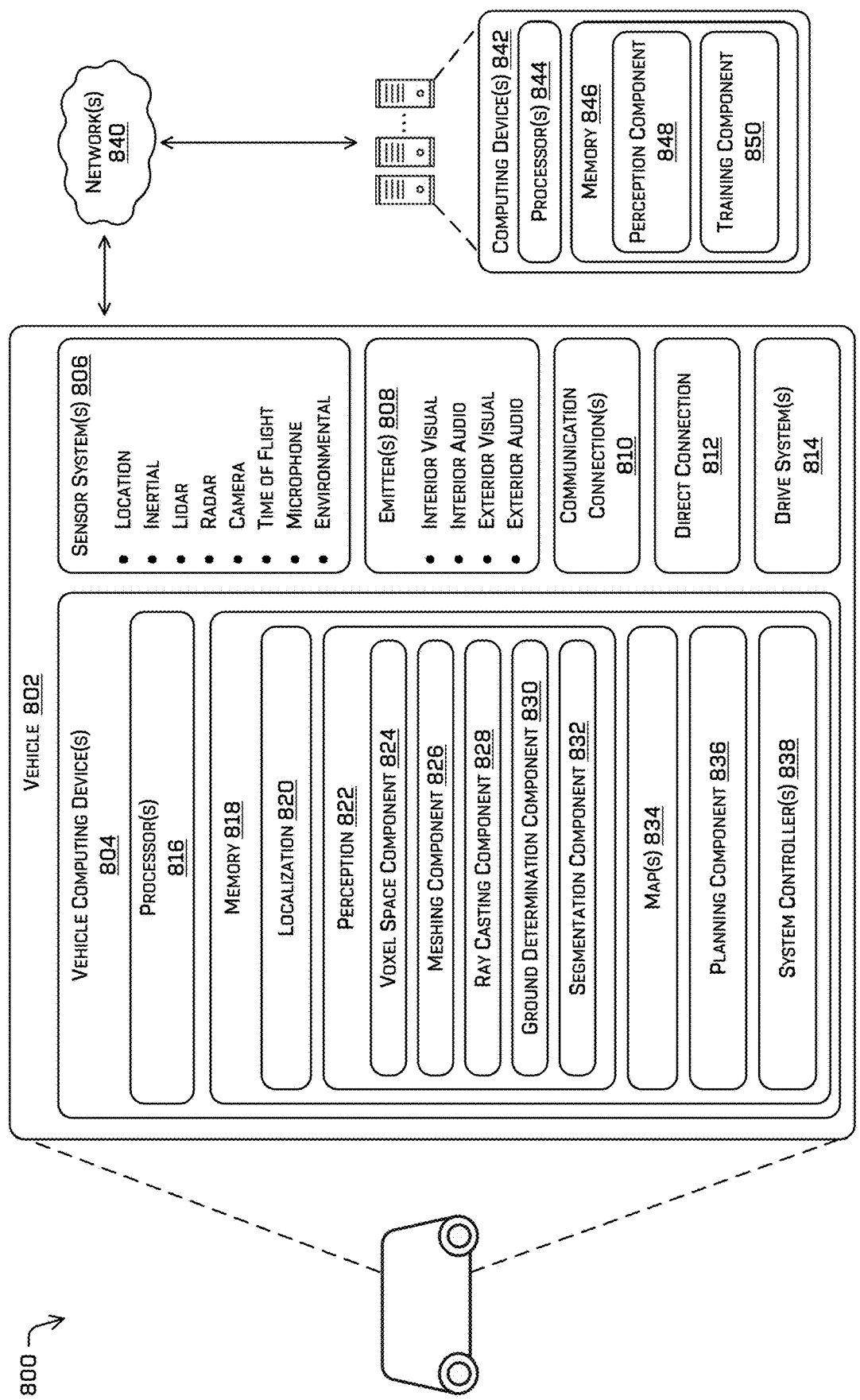
FIG. 8 depicts a block diagram of an example system for implementing the techniques described herein.

FIG. 8 depicts a block diagram of an example system 800 for implementing the techniques described herein. In at least one example, the system 800 can include a vehicle 802. In some examples, the vehicle 802 can correspond to the vehicle 106 in FIG. 1.

The example vehicle 802 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 802 can be configured to control all functions from start to completion of the trip, including all parking functions, it may not include a driver and/or controls for driving the vehicle 802, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 802 can include vehicle computing device(s) 804, one or more sensor systems 806, one or more emitters 808, one or more communication connections 810, at least one direct connection 812, and one or more drive systems 814.

The vehicle computing device(s) 804 can include one or more processors 816 and memory 818 communicatively coupled with the one or more processors 816. In the illustrated example, the vehicle 802 is an autonomous vehicle; however, the vehicle 802 could be any other type of vehicle or robotic platform. In the illustrated example, the memory 818 of the vehicle computing device(s) 804 stores a localization component 820, a perception component 822 comprising a voxel space component 824, a meshing component 826, a ray casting component 828, a ground determination component 830, and a segmentation component 832, one or more maps 834, a planning component 836, and one or more system controllers 838. Though depicted in FIG. 8 as residing in the memory 818 for illustrative purposes, it is contemplated that the localization component 820, the perception component 822, the voxel space component 824, the meshing component 826, the ray casting component 828, the ground determination component 830, the segmentation component 832, the one or more maps 834, the planning component 836, and the one or more system controllers 838 can additionally, or alternatively, be accessible to the vehicle 802 (e.g., stored on, or otherwise accessible by, memory remote from the vehicle 802).

In at least one example, the localization component 820 can include functionality to receive data from the sensor system(s) 806 to determine a position and/or orientation of the vehicle 802 (e.g., one or more of an x-, y-, z-position, roll, pitch, or yaw). For example, the localization component 820 can include and/or request/receive a map of an environment and can continuously determine a location and/or orientation of the autonomous vehicle within the map. In some instances, the localization component 820 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 820 can provide data to various components of the vehicle 802 to determine an initial position of an autonomous vehicle for generating a trajectory or for associating sensor data with a multiresolution voxel space, as discussed herein.

In some instances, and in general, the perception component 822 can include functionality to perform object detection, segmentation, and/or classification according to the techniques discussed herein. In some examples, the perception component 822 can provide processed sensor data that indicates a presence of an entity that is proximate to the vehicle 802 and/or a classification of the entity as an entity type (e.g., car, pedestrian, cyclist, animal, building, tree, road surface, curb, sidewalk, stoplight, stop sign, unknown, etc.). In additional or alternative examples, the perception component 822 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the voxel space component 824 can include functionality to generate a multiresolution voxel space comprising any number of levels. As discussed herein, a multiresolution voxel space can comprise two or more levels, wherein each level can be represented as an individual voxel space. In some examples, an outermost or root level can represent a largest area of an environment, whereby successive levels represent smaller voxel spaces associated with a higher resolution representation of sensor data. As sensor data is captured of an environment, such sensor data can be associated with the multiresolution voxel space. In some examples, a voxel can accumulate sensor data over time, with an individual voxel including processed data, such a number of data points, an average intensity, an average x-value of sensor data associated with the individual voxel, an average-y value of the sensor data associated with the individual voxel, an average z-value of the sensor data associated with the individual voxel, and/or a covariance matrix based on the sensor data associated with the voxel.

In some instances, the meshing component 826 can include functionality to select voxel(s) from various level(s) of the multiresolution voxel grid to generate or otherwise determine a mesh of an environment. In some examples, the meshing component 826 can determine, based on a hierarchy of voxels discussed herein, whether a voxel or group of child voxels comprise sufficient data to generate a mesh for a respective portion of an environment. Additional details of evaluating voxels for generating a mesh are provided in connection with FIGS. 4A and 4B, as well as throughout this disclosure.

In some instances, the ray casting component 828 can include functionality to evaluate an occupancy of voxels in the multiresolution voxel space to determine whether voxel(s) represent a static object or a dynamic object, for example. Additional details of ray casting operations are provided in connection with FIG. 5, as well as throughout this disclosure.

In some instances, the ground determination component 830 can include functionality to, with respect to a target voxel, receive segmentation information and to evaluate voxels that neighbor the target voxel (or that are otherwise associated with the target voxel) to determine whether the target voxel is a candidate ground voxel. Additional details of determining ground voxels are provided in connection with FIG. 6, as well as throughout this disclosure.

In some instances, the segmentation component 832 can include functionality to cluster or otherwise segment voxels to identify objects represented in the multiresolution voxel space. As discussed herein, segmentation operations can span multiple levels of the multiresolution voxel space to identify the highest resolution data for segmentation, where available. Additional details of segmentation in the multiresolution voxel context are provided in connection with FIG. 7, as well as throughout this disclosure.

The memory 818 can further include one or more maps 834 that can be used by the vehicle 802 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 834 can include at least one map (e.g., images and/or a mesh).

In some examples, the vehicle 802 can be controlled based at least in part on the one or more maps 834. That is, the one or more maps 834 can be used in connection with the localization component 820, the perception component 822, and/or the planning component 836 to determine a location of the vehicle 802, identify objects in an environment, and/or generate routes and/or trajectories to navigate within an environment.

In some examples, the one or more maps 834 can be stored on a remote computing device(s) (such as the computing device(s) 842) accessible via network(s) 840. In some examples, multiple maps 834 can be stored based on, for example, a characteristic (e.g., type of entity, time of day, day of week, season of the year, etc.). Storing multiple maps 834 can have similar memory requirements, but can increase the speed at which data in a map can be accessed.

In general, the planning component 836 can determine a path for the vehicle 802 to follow to traverse the environment. For example, the planning component 836 can determine various routes and trajectories and various levels of detail. For example, the planning component 836 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 836 can generate an instruction for guiding the autonomous vehicle along at least a portion of the route from the first location to the second location. In at least one example, the planning component 836 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 802 to navigate.

In some examples, the planning component 836 can include a prediction component that can include functionality to generate predicted information associated with objects and/or occluded regions in an environment. In some examples, a prediction component can be implemented to predict locations of occlusions in an environment based on movement of an object and/or predicted location(s) of the vehicle 802 along a candidate trajectory. In some examples, the techniques discussed herein can be implemented to predict locations of objects (e.g., a vehicle, a pedestrian, and the like) as the vehicle traverses an environment. In some examples, a prediction component can generate one or more predicted trajectories for such target objects based on attributes of the target object and/or other objects proximate the target object.

In at least one example, the vehicle computing device(s) 804 can include one or more system controllers 838, which can be configured to control steering, propulsion, braking, safety, emitters, communication, and other systems of the vehicle 802. These system controller(s) 838 can communicate with and/or control corresponding systems of the drive system(s) 814 and/or other components of the vehicle 802.

As can be understood, the components discussed herein (e.g., the localization component 820, the perception component 822, the voxel space component 824, the meshing component 826, the ray casting component 828, the ground determination component 830, the segmentation component 832, the one or more maps 834, the planning component 836, and the one or more system controllers 838) are described as divided for illustrative purposes. However, the operations performed by the various components can be combined or performed in any other component. Further, any of the components discussed as being implemented in software can be implemented in hardware, and vice versa. Further, any functionality implemented in the vehicle 802 can be implemented in the computing device(s) 842, or another component (and vice versa).

In at least one example, the sensor system(s) 806 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 806 can include multiple instances of each of these or other types of sensors. For instance, the time of flight sensors can include individual time of flight sensors located at the corners, front, back, sides, and/or top of the vehicle 802. As another example, the camera sensors can include multiple cameras disposed at various locations about the exterior and/or interior of the vehicle 802. The sensor system(s) 806 can provide input to the vehicle computing device(s) 804. Additionally or alternatively, the sensor system(s) 806 can send sensor data, via the one or more networks 840, to the one or more computing device(s) 842 at a particular frequency, after a lapse of a predetermined period of time, in near real-time, etc.

The vehicle 802 can also include one or more emitters 808 for emitting light and/or sound, as described above. The one or more emitters 808 in this example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitters 808 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 802 can also include one or more communication connection(s) 810 that enable communication between the vehicle 802 and one or more other local or remote computing device(s). For instance, the communication connection(s) 810 can facilitate communication with other local computing device(s) on the vehicle 802 and/or the drive system(s) 814. Also, the communication connection(s) 810 can allow the vehicle to communicate with other nearby computing device(s) (e.g., other nearby vehicles, traffic signals, etc.). The communications connection(s) 810 also enable the vehicle 802 to communicate with a remote teleoperations computing device or other remote services.

The communications connection(s) 810 can include physical and/or logical interfaces for connecting the vehicle computing device(s) 804 to another computing device or a network, such as network(s) 840. For example, the communications connection(s) 810 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 802 can include one or more drive systems 814. In some examples, the vehicle 802 can have a single drive system 814. In at least one example, if the vehicle 802 has multiple drive systems 814, individual drive systems 814 can be positioned on opposite ends of the vehicle 802 (e.g., the front and the rear, etc.). In at least one example, the drive system(s) 814 can include one or more sensor systems to detect conditions of the drive system(s) 814 and/or the surroundings of the vehicle 802. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 814. In some cases, the sensor system(s) on the drive system(s) 814 can overlap or supplement corresponding systems of the vehicle 802 (e.g., sensor system(s) 806).

The drive system(s) 814 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 814. Furthermore, the drive system(s) 814 also include one or more communication connection(s) that enable communication by the respective drive system with one or more other local or remote computing device(s).

In at least one example, the direct connection 812 can provide a physical interface to couple the one or more drive system(s) 814 with the body of the vehicle 802. For example, the direct connection 812 can allow the transfer of energy, fluids, air, data, etc. between the drive system(s) 814 and the vehicle. In some instances, the direct connection 812 can further releasably secure the drive system(s) 814 to the body of the vehicle 802.

In at least one example, the localization component 820, the perception component 822, the voxel space component 824, the meshing component 826, the ray casting component 828, the ground determination component 830, the segmentation component 832, the one or more maps 834, the planning component 836, and the one or more system controllers 838 can process sensor data, as described above, and can send their respective outputs, over the one or more networks 840, to one or more computing device(s) 842. In at least one example, the localization component 820, the perception component 822, the voxel space component 824, the meshing component 826, the ray casting component 828, the ground determination component 830, the segmentation component 832, the one or more maps 834, the planning component 836, and the one or more system controllers 838 can send their respective outputs to the one or more computing device(s) 842 at a particular frequency, after a lapse of a predetermined period of time, in near real-time, etc.

In some examples, the vehicle 802 can send sensor data to one or more computing device(s) 842 via the network(s) 840. In some examples, the vehicle 802 can send raw sensor data to the computing device(s) 842. In other examples, the vehicle 802 can send processed sensor data and/or representations of sensor data to the computing device(s) 842. In some examples, the vehicle 802 can send sensor data to the computing device(s) 842 at a particular frequency, after a lapse of a predetermined period of time, in near real-time, etc. In some cases, the vehicle 802 can send sensor data (raw or processed) to the computing device(s) 842 as one or more log files.

The computing device(s) 842 can include processor(s) 844 and a memory 846 storing a perception component 848 and a training component 850.

In some instances, the perception component 848 can include functionality to generate a mesh, to determine a ground surface, to remove dynamic obstacles (e.g., using ray casting operations), and/or to segment objects in an environment, as discussed herein. In some examples, the perception component 848 can receive sensor data from a vehicle (e.g., the vehicle 802) to determine a map of an environment. In some examples, the perception component 848 can include some or all of the functionality of the perception component 822.

In some instances, the training component 850 can include functionality to train one or more models to associate sensor data with voxels and/or to perform any additional operations discussed herein. In some instances, the training component 850 can communicate information generated by the one or more models to the vehicle computing device(s) 804 to revise how to control the vehicle 802 in response to different situations.

For example, the training component 850 can train one or more machine learning models to generate the machine learned model components discussed herein. In some examples, the training component 850 can include functionality to search data logs and determine sensor data for training. The training component 850 can generate training data associated with different levels and can input the training data to algorithms to determine differences in outputs. The training component 850 can determine differences or can receive the differences from another component. The differences and training data can be input to a machine learning model where a known result (e.g., a ground truth, such as the known portions or regions corresponding to differences between algorithm outputs) can be used to adjust weights and/or parameters of the machine learning model to minimize an error.

For instance, aspects of some or all of the components discussed herein can include any models, algorithms, and/or machine learned algorithms. For example, in some instances, the components in the memory 846 (and the memory 818, discussed above) can be implemented as a neural network. In some examples, the training component 850 can utilize a neural network to generate and/or execute one or more models to determine data level(s) for portion(s) or region(s) of sensor data, as discussed herein.

As described herein, an exemplary neural network is a biologically inspired algorithm which passes input data through a series of connected levels to produce an output. Each level in a neural network can also comprise another neural network, or can comprise any number of levels (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 816 of the vehicle 802 and the processor(s) 844 of the computing device(s) 842 can be any suitable processor capable of executing instructions to process data and perform operations as described herein. By way of example and not limitation, the processor(s) 816 and 844 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 818 and 846 are examples of non-transitory computer-readable media. The memory 818 and 846 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information.

The architectures, systems, and individual elements described herein can include many other logical, programmatic, and physical components, of which those shown in the accompanying figures are merely examples that are related to the discussion herein.

It should be noted that while FIG. 8 is illustrated as a distributed system, in alternative examples, components of the vehicle 802 can be associated with the computing device(s) 842 and/or components of the computing device(s) 842 can be associated with the vehicle 802. That is, the vehicle 802 can perform one or more of the functions associated with the computing device(s) 842, and vice versa. Further, aspects of the perception component 822 (and subcomponents) can be performed on any of the devices discussed herein.

Figure 9:
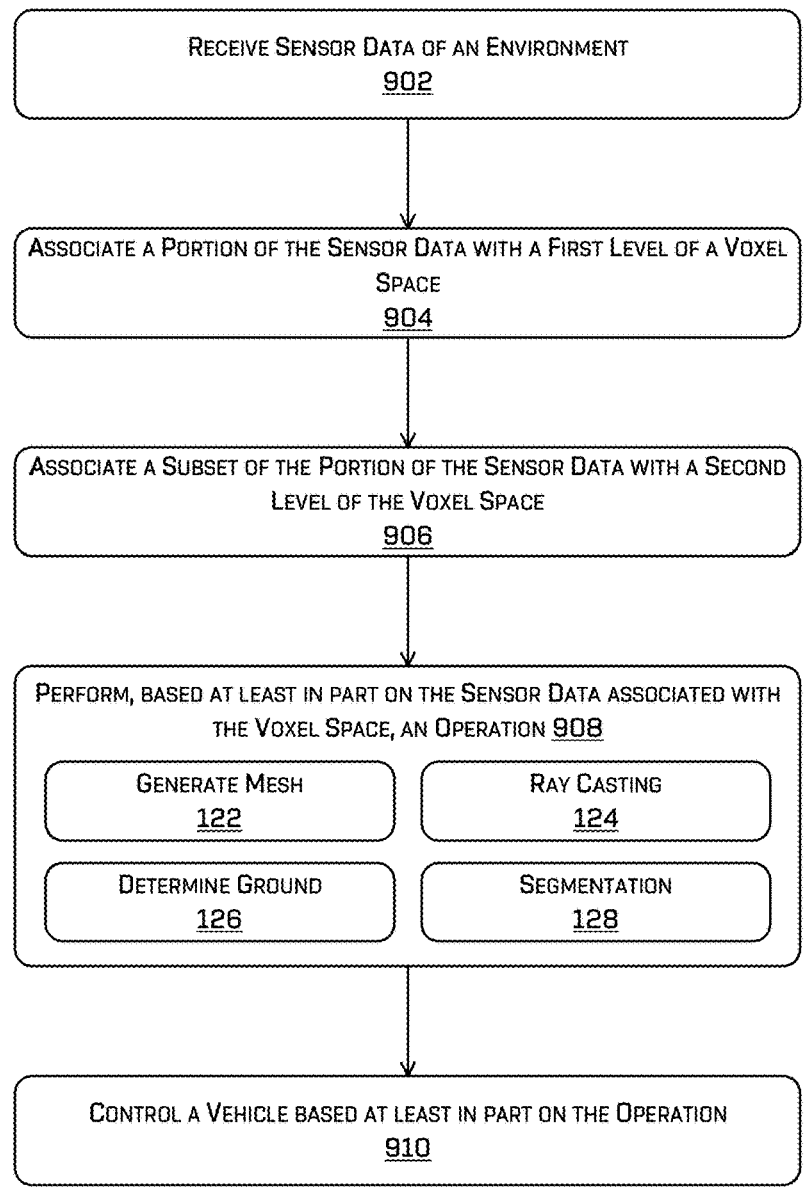
FIG. 9 depicts an example process for associating sensor data with a multiresolution voxel space, performing an operation based on the voxel space, and controlling a vehicle.

FIG. 9 illustrates an example process in accordance with embodiments of the disclosure. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 9 depicts an example process 900 for associating sensor data with a multiresolution voxel space, performing an operation based on the voxel space, and controlling a vehicle. For example, some or all of the process 900 can be performed by one or more components in FIG. 8, as described herein. For example, some or all of the process 900 can be performed by the vehicle computing device(s) 804.

At operation 902, the process can include receiving sensor data of an environment. In some examples, the operation 902 can include receiving and/or capturing time of flight data, lidar data, image data, radar data, and the like, of an environment. In some examples, the operation 902 can be performed by a vehicle (e.g., an autonomous vehicle) as the vehicle traverses the environment.

At operation 904, the process can include associating a portion of the sensor data with a first level of a voxel space. In some examples, a first level of a voxel space can correspond to the first level 114 of the voxel space. In some instances, the operation 904 can include statistically accumulating sensor data and processing the data as it is added to individual voxels. For example, individual voxels may include data representing a number of data points, an average intensity, an average x-value of the data, an average y-value of the data, an average z-value of the data, and/or a covariance matrix based on the sensor data associated with the individual voxel. Thus, in some instances, data associated with individual voxels may represent processed data, in part, to improve processing performance of the system.

At operation 906, the process can include associating a subset of the portion of the sensor data with a second level of the voxel space. For example, a second level of the voxel space can correspond to the second level 116 of the voxel space. In some examples, at least a portion of a region of the environment associated with the second level can correspond to at least a portion of a region of the environment associated with the first level. Thus, the subset of the portion can be associated with at least the first level and the second level. In some examples, the operation 906 can comprise statistically accumulating data in the second level in parallel with operations discussed above in connection with the operation 904.

Although operations 904 and 906 refer to a first level and a second level, the process 900 can be performed for a voxel space comprising any number of levels, and is not limited to two. For example, a multiresolution voxel space may comprise one level (with individual voxels sized based on a distance from a sensor), two levels, three levels, five levels, ten levels, and so on.

An operation 908, the process can include performing, based at least in part on the sensor data associated with the voxel space, an operation. In some examples, the operation can include, but is not limited to, one or more of the generate mesh operation 122, the ray casting operation 124, the determine ground operation 126, the segmentation operation 128, and the like. Additional details of the operations are discussed above in connection with FIG. 1, as well as throughout the disclosure.

At operation 910, the process can include controlling a vehicle based at least in part on the operation. In some instances, the operation 910 can include generating a trajectory to stop the vehicle or to otherwise control the vehicle to safely traverse the environment. In some examples, the operation 910 can include modifying a candidate trajectory based on detected objects, for example, to determine a modified trajectory for the vehicle to follow in the environment.

In some examples, in addition to or instead of the operations discussed above, the operation 910 can include updating a voxel space based on a motion of a sensor (or of a vehicle associated with the sensor) in the environment. For example, the voxel space can be updated by a distance based at least in part on an extent (e.g., length, width, and/or height) of a largest voxel associated with the multiresolution voxel space.

EXAMPLE CLAUSES

A. A system comprising: one or more processors; and one or more computer-readable media storing instructions executable by the one or more processors, wherein the instructions, when executed, cause the system to perform operations comprising: capturing lidar data of an environment using a lidar sensor of an autonomous vehicle; associating a portion of the lidar data with a first voxel of a first level of a voxel space; associating a subset of the portion of the lidar data with a second voxel of a second level of the voxel space, wherein a first region of the environment represented by the first voxel corresponds to a second region of the environment represented by the second voxel; performing, as an operation and based at least in part on the lidar data associated with the voxel space, at least one of a meshing operation, a ray casting operation, a ground surface determination operation, or a segmentation operation; and controlling the autonomous vehicle based at least in part on the operation.

B: The system of paragraph A, wherein a first number of voxels associated with the first level is a same as a second number of voxels associated with the second level.

C: The system of paragraph A or B, the operations further comprising: updating, as an updated voxel space, the voxel space based at least in part on a movement of the autonomous vehicle, wherein a location of the updated voxel space is based at least in part on a size of the first voxel.

D: The system of any of paragraphs A-C, wherein a first size of the first voxel is larger than a second size of the second voxel, and wherein the second region of the environment represented by the second voxel is within the first region of the environment represented by the second voxel.

E: The system of any of paragraphs A-D, wherein the first level of the voxel space and the second level of the voxel space are associated with a center of the autonomous vehicle.

F: A method comprising: receiving sensor data representing an environment; associating a portion of the sensor data with a first voxel of a first level of a voxel space, the first level representing a first region of the environment; associating a subset of the portion of the sensor data with a second voxel of a second level of the voxel space, the second level representing a second region of the environment that is associated with the first region of the environment; performing an operation based at least in part on the sensor data associated with the voxel space; and controlling a vehicle based at least in part on the operation.

G: The method of paragraph F, further comprising: updating, as an updated voxel space, the voxel space based at least in part on a movement of the vehicle, wherein a location of the updated voxel space is based at least in part on a size of the first voxel:

H: The method of paragraph F or G, wherein a first size of the first voxel is larger than a second size of the second voxel.

I. The method of any of paragraphs F-H, wherein the second region of the environment is a subset of the first region of the environment.

J: The method of any of paragraphs F-I, wherein the operation comprises a ground surface determination operation, the ground surface determination operation comprising: receiving semantic information associated with the first voxel, the semantic information indicating a ground surface; evaluating a gradient based at least in part on a first centroid associated with the first voxel and a second centroid associated with a neighboring voxel to determine that the neighboring voxel is a horizontal voxel; determining that a number of horizontal neighbor voxels meets or exceeds a threshold value; and determining that the first voxel is a candidate ground voxel based at least in part on the semantic information and the number of horizontal neighbor voxels meeting or exceeding the threshold value.

K: The method of any of paragraphs F-J, wherein the operation comprises a segmentation operation, the segmentation operation comprising: receiving first segmentation information associated with the first level of the voxel space; receiving second segmentation information associated with the second level of the voxel space; associating a first portion of voxels of the first level with an object based at least in part on the first segmentation information; and associating a second portion of voxels of the second level with the object based at least in part on the second segmentation information.

L: The method of any of paragraphs F-K, wherein a first number of voxels associated with the first level of the voxel space is a same as a second number of voxels associated with the second level of the voxel space.

M: The method of any of paragraphs F-L, wherein the operation comprises at least one of a meshing operation, a ray casting operation, a ground surface determination operation, or a segmentation operation.

N: The method of any of paragraphs F-M, wherein a first center of the first level and a second center of the second level are associated with a third center of the vehicle.

O: A non-transitory computer-readable medium storing instructions that, when executed, cause one or more processors to perform operations comprising: receiving sensor data representing an environment; associating a portion of the sensor data with a first voxel of a first level of a voxel space, the first level representing a first region of the environment; associating a subset of the portion of the sensor data with a second voxel of a second level of the voxel space, the second level representing a second region of the environment that is associated with the first region of the environment; performing an operation based at least in part on the sensor data associated with the voxel space; and controlling a vehicle based at least in part on the operation.

P: The non-transitory computer-readable medium of paragraph O, the operations further comprising: updating, as an updated voxel space, the voxel space based at least in part on a movement of the vehicle, wherein a location of the updated voxel space is based at least in part on a size of the first voxel wherein the second region of the environment is a subset of the first region of the environment.

Q: The non-transitory computer-readable medium of paragraph O or P, wherein the second region of the environment is a subset of the first region of the environment.

R: The non-transitory computer-readable medium of any of paragraphs O Q, wherein a first center of the first level and a second center of the second level are associated with a third center of the vehicle.

S: The non-transitory computer-readable medium of any of paragraphs O R, wherein: a first number of voxels associated with the first level of the voxel space is a same as a second number of voxels associated with the second level of the voxel space; and a first volume of the first level of the voxel space is greater than a second volume of the second level of the voxel space.

T: The non-transitory computer-readable medium of any of paragraphs O S, wherein the sensor data comprises at least one of lidar data, radar data, time-of-flight data, or depth data based on image data.

While the example clauses described above are described with respect to one particular implementation, it should be understood that, in the context of this document, the content of the example clauses can also be implemented via a method, device, system, a computer-readable medium, and/or another implementation. Additionally any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
capturing lidar data of an environment using a lidar sensor of an autonomous vehicle;
associating a portion of the lidar data with a first voxel of a first level of a voxel space;
associating a subset of the portion of the lidar data with a second voxel of a second level of the voxel space, wherein a first region of the environment represented by the first voxel corresponds to a second region of the environment represented by the second voxel;
wherein the second region of the environment overlaps at least a portion of the first region of the environment;
performing, as an operation and based at least in part on the lidar data associated with the voxel space, at least one of a meshing operation, a ray casting operation, a ground surface determination operation, or a segmentation operation;
controlling the autonomous vehicle based at least in part on the operation; and
updating, as an updated voxel space, the voxel space based at least in part on a movement of the autonomous vehicle corresponding to a size of a largest voxel of the voxel space,
wherein a first number of voxels associated with the first level is the same as a second number of descendent voxels of individual first number of voxels associated with the second level.

2. The system of claim 1,
a location of the updated voxel space is based at least in part on a size of the first voxel.

3. The system of claim 2, the operations further comprising:
determining a portion of the second level of the voxel space after the movement, the portion including no lidar data;
obtaining the lidar data associated with another portion of the first level of the voxel space corresponding to the portion of the second level of the voxel space; and
associating the lidar data associated with another portion of the first level of the voxel space with the portion of the second level of the voxel space.

4. The system of claim 2, the operations further comprising:
determining a region of the environment represented by the first level of the voxel space before the movement and being represented by the second level of the voxel space after the movement; and
determining the lidar data associated with the second level of the voxel space based at least in part on the lidar data associated with the first level of the voxel space.

5. The system of claim 1, wherein a first size of the first voxel is larger than a second size of the second voxel, and wherein the second region of the environment represented by the second voxel is within the first region of the environment represented by the first voxel.

6. The system of claim 1, wherein the first level of the voxel space and the second level of the voxel space are associated with a center of the autonomous vehicle.

7. The system of claim 1, the operations further comprising:
determining that a distance of the movement corresponds to a size of the largest voxel of the first level; and
shifting, based at least in part on the distance corresponding to the size, the voxel space by the size of the largest voxel of the first level.

8. A method comprising:
receiving sensor data representing an environment;
associating a portion of the sensor data with a first voxel of a first level of a voxel space, the first level representing a first region of the environment;
associating a subset of the portion of the sensor data with a second voxel of a second level of the voxel space, the second level representing a second region of the environment that is associated with the first region of the environment;
wherein the second region of the environment is the same as at least a portion of the first region of the environment;
performing an operation based at least in part on the sensor data associated with the voxel space;
controlling a vehicle based at least in part on the operation; and
updating, as an updated voxel space, the voxel space based at least in part on a movement of the vehicle corresponding to a size of a largest voxel of the voxel space,
wherein a first number of voxels associated with the first level is the same as a second number of descendent voxels of individual first number of voxels associated with the second level.

9. The method of claim 8,
wherein a location of the updated voxel space is based at least in part on a size of the first voxel.

10. The method of claim 8, wherein a first size of the first voxel is larger than a second size of the second voxel.

11. The method of claim 8, wherein the second region of the environment is a subset of the first region of the environment.

12. The method of claim 8, wherein the operation comprises a ground surface determination operation, the ground surface determination operation comprising:
receiving semantic information associated with the first voxel, the semantic information indicating a ground surface;
evaluating a gradient based at least in part on a first centroid associated with the first voxel and a second centroid associated with a neighboring voxel to determine that the neighboring voxel is a horizontal voxel;
determining that a number of horizontal neighbor voxels meets or exceeds a threshold value; and
determining that the first voxel is a candidate ground voxel based at least in part on the semantic information and the number of horizontal neighbor voxels meeting or exceeding the threshold value.

13. The method of claim 8, wherein the operation comprises a segmentation operation, the segmentation operation comprising:
receiving first segmentation information associated with the first level of the voxel space;

receiving second segmentation information associated with the second level of the voxel space;

associating a first portion of voxels of the first level with an object based at least in part on the first segmentation information; and associating a second portion of voxels of the second level with the object based at least in part on the second segmentation information.

14. The method of claim 8, wherein the operation comprises at least one of a meshing operation, a ray casting operation, a ground surface determination operation, or a segmentation operation.

15. The method of claim 8, wherein a first center of the first level and a second center of the second level are associated with a third center of the vehicle.

16. A non-transitory computer-readable medium storing instructions that, when executed, cause one or more processors to perform operations comprising:

receiving sensor data representing an environment;

associating a portion of the sensor data with a first voxel of a first level of a voxel space, the first level representing a first region of the environment;

associating a subset of the portion of the sensor data with a second voxel of a second level of the voxel space, the second level representing a second region of the environment that is associated with the first region of the environment;

wherein the second region of the environment is a subset of the first region of the environment;

performing an operation based at least in part on the sensor data associated with the voxel space;

controlling a vehicle based at least in part on the operation; and updating, as an updated voxel space, the voxel space based at least in part on a movement of the vehicle corresponding to a size of a largest voxel of the voxel space, wherein a first number of voxels associated with the first level is the same as a second number of descendent voxels of individual first number of voxels associated with the second level.

17. The non-transitory computer-readable medium of claim 16, wherein a location of the updated voxel space is based at least in part on a size of the first voxel wherein the second region of the environment is a subset of the first region of the environment.

18. The non-transitory computer-readable medium of claim 16, wherein:

a first number of voxels associated with the first level of the voxel space is the same as a second number of voxels associated with the second level of the voxel space; and a first volume of the first level of the voxel space is greater than a second volume of the second level of the voxel space.

19. The non-transitory computer-readable medium of claim 16, wherein the sensor data comprises at least one of lidar data, radar data, time-of-flight data, or depth data based on image data.

20. The non-transitory computer-readable medium of claim 16, wherein the operation comprises at least one of a meshing operation, a ray casting operation, a ground surface determination operation, or a segmentation operation.

* * * * *